United States Patent [19]

Sperry

[11] 4,023,733
[45] May 17, 1977

[54] FOAM DISPENSING APPARATUS

[75] Inventor: Charles R. Sperry, Wilton, Conn.

[73] Assignee: Instapak Corporation, Danbury, Conn.

[22] Filed: Sept. 26, 1975

[21] Appl. No.: 617,042

Related U.S. Application Data

[63] Continuation-in-part of Ser. No. 517,892, Oct. 25, 1974, Pat. No. 3,945,569.

[52] U.S. Cl. .............................. 239/112; 239/117; 239/414
[51] Int. Cl.² ........................................ B05B 15/02
[58] Field of Search .......... 239/112, 114, 115, 116, 239/117, 118, 123, 427; 222/145

[56] References Cited

UNITED STATES PATENTS

| | | | |
|---|---|---|---|
| 3,157,361 | 11/1964 | Heard | 239/427 |
| 3,338,523 | 8/1967 | Tibbitt | 239/118 X |
| 3,687,370 | 8/1972 | Sperry | 239/117 X |
| 3,786,990 | 1/1974 | Hagfors | 239/117 X |

Primary Examiner—Evon C. Blunk
Assistant Examiner—Michael Mar
Attorney, Agent, or Firm—Albert Siegel

[57] ABSTRACT

Apparatus for making and dispensing two liquids, such as organic resins and polyisocyanates which react to form a polyurethane foam. The apparatus comprises a dispensing gun including a mixing chamber having two liquid entry ports in a non-aligned relationship with each other. One of the entry ports is positioned forward or upstream from the other. A reciprocally mounted valving rod has an extended position for closing the ports and a retracted-position for opening the ports and permitting liquid flow into the mixing chamber.

1 Claim, 6 Drawing Figures

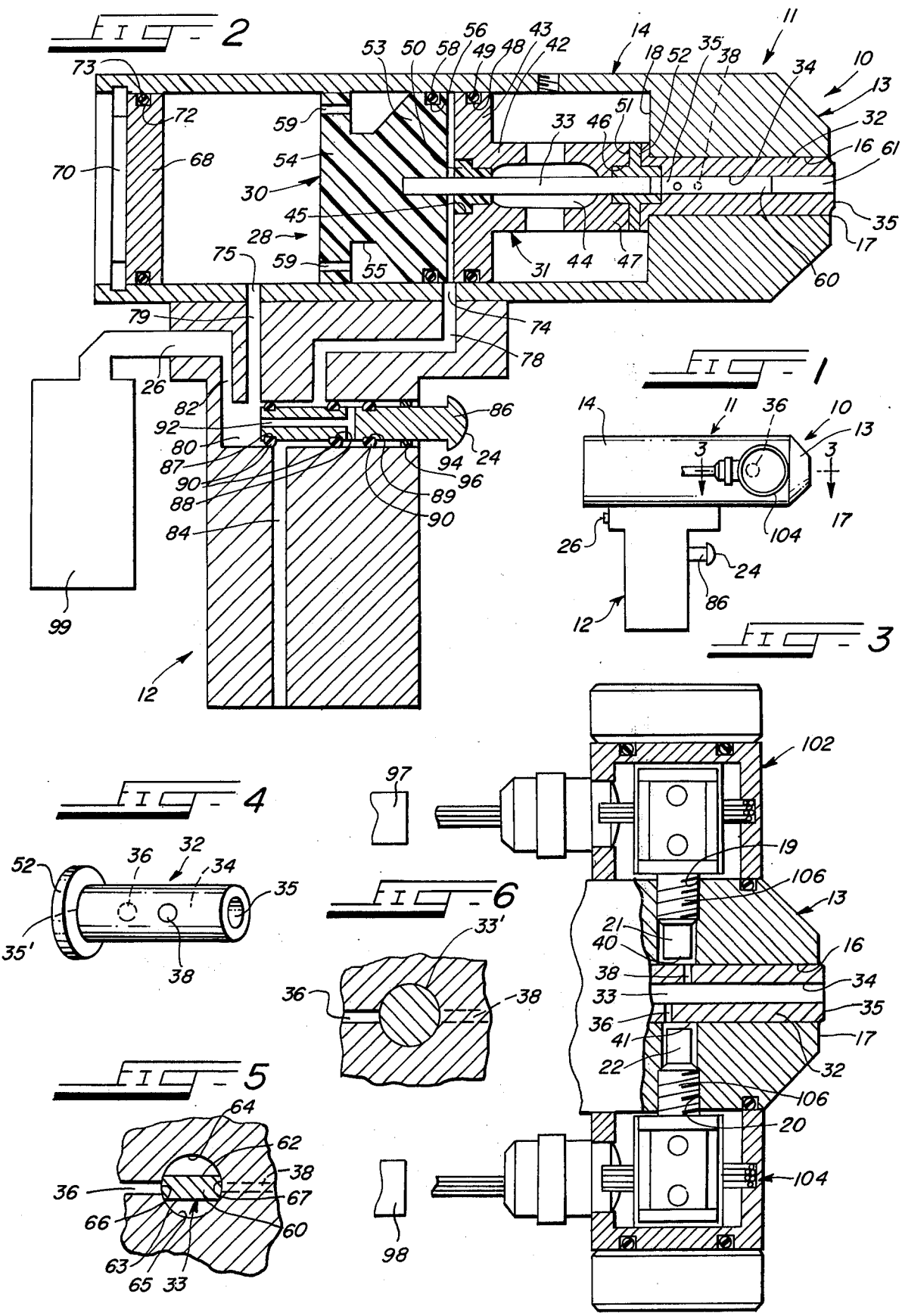

FOAM DISPENSING APPARATUS

REFERENCE TO OTHER APPLICATION

This patent Application is a continuation in-part of my co-pending U.S. patent application entitled "Foam Dispensing Apparatus" Ser. No. 517,892, filed Oct. 25, 1974, now U.S. Pat. No. 3,945,569 and includes subject matter which is common to said earlier application.

The mode of operation of the apparatus herein is essentially the same as set out in said prior application and in my U.S. Pat. No. 3,687,370, and the teachings of both are incorporated by reference herein.

BACKGROUND OF THE INVENTION

The invention relates generally to an apparatus for mixing and dispensing a plurality of liquids and more particularly relates to a dispensing member for mixing a plurality of substances used in the formation of polyurethane foam.

In my U.S. Pat. No. 3,687,370 and my aforesaid patent application devices are disclosed for mixing and dispensing a plurality of liquids for forming polyurethane foam. The devices contain a mixing chamber for mixing a first liquid such as liquid organic resin, and a second liquid such as an isocyanate for forming polyurethane foam. The liquids were injected into the mixing chamber via a pair of aligned inlet ports positioned on opposed sides of the chamber. A reciprocating valving rod moved from a retracted position to an extended position to open the ports for liquid mixing and to close the inlet ports for preventing any further flow of liquid. When the valving rod moves from the extended to the retracted position the ports are open to permit liquid flow.

Since the liquid inlet ports into the mixing chamber of the prior foam dispensers were aligned with each other the flow pressure of one liquid was sometimes sufficient to cross-feed into the inlet port for the other liquid. Frequently when cross-feed occurred, a reaction caused the two liquids in the inlet port to coagulate, which eventually hardened, and either partially or completely blocked liquid flow into the mixing chamber. The cleaning fluid carried by the valving rod to dissolve any hardened or foamed substance remaining in the mixing chamber could not penetrate the inlet ports to dissolve any blockage building up therein. Such obstruction disrupted further use of the gun until the barrel assembly was disassembled and the hardened substance removed from the inlet port(s).

The present invention is an improvement over the prior dispensing devices of my above noted patent and patent application in that I now form the liquid entry ports so that one is spaced forward or upstream from the other. This prevents undesirable cross-feeding across the mixing chamber from one liquid entry port into the other liquid entry port. Such construction also now permits higher operating pressures at the ports to assure better mixing of the two chemicals.

In an embodiment of the present invention a dispensing apparatus includes a tubular member having a pair of liquid entry ports formed spaced apart therein, with one such port positioned forward with respect to the other. The inside of the tubular member defines the mixing chamber. A pair of liquid input passageways are aligned with each other, and each passageway communicates with one of the entry ports for ejecting a liquid into the mixing chamber. The cross-sectional areas of the liquid passageways are substantially greater than the cross-sectional areas of the ports, so that the tubular member is insertable into the dispensing gun whereby either entry port communicates with either of the liquid input passageways.

BRIEF DESCRIPTION OF THE DRAWINGS

Referring to the drawings in which the same characters of reference are employed to indicate corresponding or similar parts throughout the several figures of the drawings:

FIG. 1 is a side view of a liquid mixing and dispensing gun, embodying the principles of the invention;

FIG. 2 is a cross-sectional view of the gun in a non-operative or closed-condition;

FIG. 3 is a fragmentary enlarged sectional view, taken on the plane of the line 3—3 in FIG. 1 and viewed in the direction indicated, to illustrate the non-aligned openings leading into the liquid mixing chamber of the gun;

FIG. 4 is a perspective view of the shank member defining the mixing chamber;

FIG. 5 is a fragmentary sectional view to illustrate the flat faced valve rod closing the openings into the mixing chamber; and FIG. 6 is a fragmentary sectional view to illustrate the fully cylindrical valve rod closing the openings into the mixing chamber.

DESCRIPTION OF THE PREFERRED EMBODIMENT

Referring now to FIGS. 1, 2 and 3 of the drawings, the reference numeral 10 indicates generally a gun for dispensing one or more liquids. The gun 10 is particularly suitable, although not limited thereby, for mixing two liquids, such as liquid organic resins and liquid polyisocyanates, which react to form polyurethane foam. The gun 10 comprises a barrel section 11 and a handle section 12.

The barrel section 11 includes a head portion 13 and a hollow cylindrical portion 14. An axial bore 16 is formed in the head 13 and extends from the tip 17 to and through an inner wall 18 to communicate with the cylindrical portion 14.

A pair of liquid entry openings 19 and 20 are formed in the head 13 on opposed lateral sides thereof as shown in FIG. 3. Inlet passages 21, 22 link openings 19 and 20 respectively with bore 16. One of the liquids is injected into the gun 10 at opening 19, and the other via opening 20.

The handle section 12 is provided with an actuating button or trigger 24, for controlling the flow of pressured air into the barrel section 11 from an air inlet port 26. When the trigger 24 is outward as shown in FIG. 1, the gun 10 is in a closed-condition and the two liquids from inlet ports 19 and 20 are prevented from mixing. When the trigger 24 is forced inward, the gun is in a dispensing-condition. Such trigger mechanism may be replaced by a remote foot control or the like to accomplish the same result.

A barrel assembly identified generally by the reference numeral 28 is removably assembled and positioned in the head 13 and the cylindrical portion 14 of the gun 10. The barrel assembly 28 comprises a movable piston 30, a substantially T-shaped reservoir member 31 and a shank member 32. A valve rod 33 is attached to piston 30, and is slidably associated with the T-member 31 and shank member 32.

The inside 34 of shank member 32 is hollow and includes open forward and rear ends 35, 35' (FIGS. 3 and 4). Shank member 32 fits into the bore 16 and the forward end 35 is positioned at the tip 17 of gun 10. The inside 34 of member 32 defines the mixing chamber for mixing the two liquids. One liquid input port 36 is formed in one side of shank member 32, and a second liquid input port 38 is formed in the opposite side thereof but positioned closer to the open forward end 35 than port 36. However, port 36 could be positioned closer to the forward end 35 than port 38 without departing from the invention herein. The shank 32 may be constructed from a plastic, such as Teflon or other suitable material.

As may be seen from FIGS. 3 and 4 the input ports 36, 38 of shank 32 are not in alignment with each other. Therefore, the possibility of any liquid injected into the gun 10 from inlet passage 22 cross-feeding into inlet passage 21 via input port 38, or liquid injected into the gun 10 from inlet passage 21 cross-feeding into inlet passage 22 via input port 36 is appreciably reduced, if not virtually eliminated.

While the ports 36 and 38 as illustrated in the drawings are 180° apart different angles may also be employed. The preferred embodiment, however, is represented by the 180° separation.

Passages 20 and 21 are in alignment with each other and the cross-sectional area of the inner ends 40, 41 of inlet passages 21, 22 are substantially greater than the cross-sectional areas of input ports 36, 38. As shown, port 38 is in communication with the inner end 40 of passage 21 and port 36 is in communication with inner end 41 of passage 22. By revolving shank 32 180° the reverse is accomplished, and port 36 would be in communication with inner end 40 and port 38 would be in communication with inner end 41. In this manner, the alignment of the ports 36, 38 with passages 20, 21, is appreciably simplified.

The T-member 31 includes a cylindrical neck 42 extending forward from an annular shoulder 43. A reservoir 44 is formed in the neck for containing a cleaning fluid such as "cellosolve" solvent. A rear axial bore 45 extends through the shoulder 43 to link with the reservoir 44, and a forward axial bore 46 extends from the reservoir 44 and through the forward end 47 of the neck 42. An annular notch 48 is formed in the outer periphery of the shoulder 43 to receive an O-ring 49, and thereby provide a seal between the shoulder 43 and the inside surface of the cylinder 14.

A T-shaped sleeve 50, which may be constructed of teflon or other suitable material, is seated in the rear bore 45 of T-member 31. The back end of a bushing 51 formed of metal is received in the forward end 47 of neck 42, and the front end of the bushing 51 extends into the rear end of the shank member 32.

A circular cap 52 is integrally formed to the rear end of the shank 32. The shank member 32 has an outer diameter just less than the diameter of bore 16 and is tightly received therein. The front side of cap 52 abutts the inner wall 18, and the back side thereof abutts the protruding circular flange of the bushing 51.

The piston 30 is pneumatically driven to move within the cylindrical portion 14 of the barrel 13 and control the movement of the valve rod 33. The piston 30 includes a forward end 53 and a rear end 54, each having a diameter slightly less than the inside diameter of the cylinder 14. Piston ends 53 and 54 are integrally connected together by a reduced diameter portion 55. An annular groove 56 is formed in the outer periphery of the forward end 53 to seat an O-ring 58. A plurality of apertures 59 spaced apart in a circular pattern extend through the rear end 54 of the piston 30.

The valve rod 33 is cylindrical except for an intermediate portion 60 adjacent to the front end 61 of the rod 33. The rear end of rod 33 is rigidly attached to the forward end 52 of the piston 30. Portion 60 includes a pair of opposed flat or planar side surfaces 62, 63 depressed inward respectively from the opposed convex side walls 64, 65 of the rod 33. The top and bottom surfaces 66, 67 of the intermediate portion 60 are convex and a continuous part of the convex top and the bottom surfaces of the rod 33.

The flattened portion 60 is in the solvent reservoir 44, when the gun 10 is in the dispensing-condition. The flattened sides 62, 63 carry the solvent into the mixing chamber, as the trigger 24 is released for switching the gun into the closed-condition.

In the alternative as shown in FIG. 6, the value rod indicated by reference 33' may be completely cylindrical.

A stop annular plate 68 is mounted at the rear end 69 of the cylindrical portion 14 of the barrel 13 in front of a retainer ring 70. An annular slot 72 is formed in plate 68 to seat an O-ring 73 therein. The forward end of the cylindrical portion 14 is defined by the inner wall 21. The piston 30 contacts the stop plate 68 when the gun 10 is in the dispensing-condition and contacts the T-member 31 when the gun is in the closed-condition.

The pneumatic means for moving the valve rod 33 will be described. Two air ports 74, 75 are provided in the cylindrical portion 14. Port 74 is always in front of the forward end 53 of the piston 30, and port 75 is positioned so that it will always be in back of the piston forward end 53.

A pair of passageways 78, 79 in the handle 12 communicate the ports 74, 75 respectively with a cavity 80 in which the trigger 24 moves. The compresses air inlet 26 communicates with the cavity 80 via passage 82. An air outlet passage 84 provides communication from cavity 80 to the outside at the butt end of handle 12.

The trigger 24 includes a shaft portion 86 which moves within cavity 80. Three spaced apart annular grooves 87, 88 and 89 are formed in the periphery of the shaft 86, to receive O-ring 90, for sealing the desired air passages. Groove 87 is located at the rear end of shaft 86, and the remaining two grooves are located approximately midway between the ends of the shaft 86. An axial hole 92 extend from the rear end of the shaft to a point intermediate between grooves 88 and 89, and a lateral hole 94 intersects hole 92.

A retainer washer 96 is mounted on the shaft 86 of the trigger 24 to prevent the trigger from slipping out from the cavity 80.

A pressurized source 97 of a first liquid such as a liquid organic resin is connected to liquid entry opening 19 and a pressurized source 98 of a second liquid such as isocyanate is connected to liquid entry opening 20. A source 99 of compressed or pressurized gas or air is coupled to the air inlet 26.

Removable connectors 102, 104 connect liquid sources 97, 98 with the liquid entry openings 19 and 20. Each connector 102, 104 includes screwprongs 106 to threadly attach the connectors 102, 104 with the threaded inside of passages 21, 22, in a secure liquid tight relationship.

MODE OF OPERATION

The operation of the gun 10 will now be described when used for polyurethane formation. A pressurized source of liquid organic resin 97 is coupled to entry opening 19 and a pressurized source of isocyanate 98 is coupled to entry opening 20. A source of compressed or pressurized gas or air 99 is connected to the inlet port 26.

In the closed-condition as shown particularly in FIG. 2, the valve rod 33 extends past the non-aligned inlet ports 36, 38 in shank member 32. The convex top and bottom surfaces 66, 67 of the flattened portion 60 block the ports 36, 38, and thereby prevent the flow of the resin and isocyanate. In the fully cylindrical valve rod 33', the convex outer surfaces also block ports 36, 38 (FIG. 6).

The trigger 24 is maintained outward (forward) by the pressure built up in cavity 80 from the gas source 99. The O-ring 90 in the rear groove 87 in the trigger shaft 86, seals the exhaust pathway 84 from the air input passage 82. O-rings 90 in grooves 88 and 89 block any air flow via holes 92, 94. Air then flows into the barrell 11 only via pathway 79, to build up pressure against the back side of the piston rear end 54. Due to the air flow via piston openings 59, pressure is also developed against the back side of the piston forward end 53. This causes the front side of piston 30 to abut the back side of shoulder 43 of the T-member 31. Air between the piston 30 and T-member 31 flows out of the barrel section 11 via passageway 78 and the space around shaft 86, and finally out of the gun through the exhaust passage 84.

In order to activate the gun 10 for mixing and spraying, the trigger 24 is pressed inward (not shown). The O-ring 90 in the rear groove 87 in the trigger shaft 86 seals the exhaust pathway 84 and passageway 70 from the air input passage 82. O-rings 90 in grooves 88, 89 confine the input air flow to passageway 78 from holes 92, 94 in the trigger shaft 86. The air pressure builds up at the front of the piston and forces the piston back toward the stop plate 68.

As the piston 30 moves backward, the valve rod (or 33') is retracted and moves past the input ports 36, and 38 in the shank 32, and thereby permitting the inflow of pressurized resin and isocyanate. The valve rod 33 moves within reservoir 44 except for the front end 61 thereof, which functions to seal off the reservoir by closing the back end of the inside 34 (mixing chamber) of shank 32 from the liquid inrush. Therefore, when the isocyanate and resin flow into the mixing chamber 34 they will mix and due to the respective pressures, will be forced or sprayed outward from the tip 17 of the gun 10.

The magnitude of liquid flow pressure will determine the rate of liquid mixing and the size of the particles ejected from the gun 10. When the gun 10 is initially in the dispensing cycle, the flattened portion 60 of the rod 33 is immersed in the cleaning fluid of the reservoir 44. In the fully cylindrical valve rod 33', the portion thereof in the mixing chamber 34 and blocking input ports 36, 38, will be immersed in the cleaning fluid of the reservoir when the valve rod 33' is retracted during the initial part of the dispensing cycle.

When it is desired to stop the dispensing, either the operator or some mechanical means releases the trigger 24, and the air pressure from inlet passageway 82 causes the trigger 24 to move forwardly to the outward or rest position. As this occurs, the piston 30 and valve rod 33 move forwardly, and the valve rod 33 closes off the liquid inlet ports 36, 38. The forward end 61 of the valve rod 33 scrapes and forces any remaining isocyanate and urethane outwardly. The solvent collecting on the flattened sides 62, 63 of portion 60 cleans any residue of the isocyanate and urethane inside the gun. Since the forward end 61 of the valve rod 33 finally moves up to the tip 17 of the gun, cleaning at the tip is also accomplished.

No appreciable, if any, cleaning fluid can penetrate into the liquid input ports 36, 38. Therefore, it is imperative to prevent a reaction from occurring in the ports 36, 38 and the formation of a solid foam obstruction therein, which would either hamper or fully block the liquid flow into the mixing chamber. The positioning of liquid entry port 38 spaced forward of liquid entry port 36, affords a safeguard against liquid cross-feed.

It will be appreciated that numerous changes and modifications can be made to the embodiment described herein without departing from the spirit and scope of the invention.

I claim:

1. In an apparatus for mixing and dispensing a plurality of liquids having a housing means, a mixing chamber in said housing means having an outlet at its forward end and a plurality of entrance ports upstream of said outlet and each entrance port for introducing fluid into said chamber, a movable valving rod for opening and closing said entrance port, means for moving said valving rod from a forward or extended-position to rear or retracted-position away from said forward end, and a reservoir adapted to hold material for cleaning said rod when in said retracted position, said rod having a reduced cross-sectional portion intermediate the ends thereof having a portion with a flat side, said flat side being positioned in said reservoir when the rod is in said retracted-position and out of the reservoir and within the mixing chamber when the rod is in the extended position, the improvement comprising:
said entrance ports being positioned opposed and axially offset from each other.

* * * * *